(12) United States Patent
Polizzi et al.

(10) Patent No.: US 11,305,942 B2
(45) Date of Patent: Apr. 19, 2022

(54) REDUCED NOISE TOOTHED BELT DRIVE

(71) Applicant: HOCHLAND SE, Heimenkirch (DE)

(72) Inventors: Claudio Polizzi, Gestratz (DE); Roland Zeuschner, Argenbuehl (DE)

(73) Assignee: HOCHLAND SE, Heimenkirch (DE)

( * ) Notice: Subject to any disclaimer, the term of this patent is extended or adjusted under 35 U.S.C. 154(b) by 0 days.

(21) Appl. No.: 17/002,786

(22) Filed: Aug. 26, 2020

(65) Prior Publication Data

US 2021/0061574 A1 Mar. 4, 2021

(30) Foreign Application Priority Data

Aug. 27, 2019 (DE) ...................... 10 2019 122 958.8

(51) Int. Cl.
| | |
|---|---|
| *B65G 23/06* | (2006.01) |
| *B65G 39/20* | (2006.01) |
| *B65G 15/14* | (2006.01) |
| *B65G 15/16* | (2006.01) |
| *B65G 23/10* | (2006.01) |

(52) U.S. Cl.
CPC .............. *B65G 23/06* (2013.01); *B65G 15/14* (2013.01); *B65G 15/16* (2013.01); *B65G 39/20* (2013.01); *B65G 23/10* (2013.01)

(58) Field of Classification Search
CPC ........ B65G 15/14; B65G 15/16; B65G 23/10; B65G 23/06; B65G 39/20; F16H 7/023
USPC ... 198/835, 626.1, 626.4, 626.6, 626.3, 814; 474/153
See application file for complete search history.

(56) References Cited

U.S. PATENT DOCUMENTS

| | | | | |
|---|---|---|---|---|
| 3,338,107 A | * | 8/1967 | Kiekhaefer | ............. F16H 7/023 474/153 |
| 3,648,823 A | * | 3/1972 | Neer | ........................ B65C 9/42 198/725 |
| 3,853,016 A | * | 12/1974 | Lane, III | ................ A01D 57/06 198/698 |
| 4,449,958 A | | 5/1984 | Conrad | |
| 4,545,778 A | | 10/1985 | Koivula | |
| 4,571,224 A | | 2/1986 | Arinaga | |
| 5,492,216 A | * | 2/1996 | McCoy | .................. B65G 15/14 198/626.5 |
| 5,901,832 A | * | 5/1999 | Woolley | ................ B65B 43/465 198/626.3 |

(Continued)

FOREIGN PATENT DOCUMENTS

| | | |
|---|---|---|
| DE | 100 11 680 A1 | 9/2001 |
| DE | 20 2005 019 111 U1 | 5/2007 |

*Primary Examiner* — James R Bidwell
(74) *Attorney, Agent, or Firm* — Norman B. Thot (57) ABSTRACT

A toothed belt drive for transport in a production process and/or a packaging process. The toothed belt drive includes a drive roller having a toothing system which runs along an outer circumference, a conveyor belt which is driven by the drive roller in a circulating direction, and a support roller. The conveyor belt includes a toothing system along an inner side and a continuous groove in the toothing system parallel to the circulating direction. The support roller includes a support disk which projects radially as an elevation so as to bear in a force-loading manner against the inner side of the conveyor belt. The elevation is a counterpart to the continuous groove of the conveyor belt. The support disk is arranged so that the elevation lies on a bottom of the continuous groove.

12 Claims, 4 Drawing Sheets

(56) References Cited

U.S. PATENT DOCUMENTS

| | | | | |
|---|---|---|---|---|
| 6,719,123 B2 * | 4/2004 | Jackson | ............... | B65H 29/12 |
| | | | | 198/626.1 |
| 7,901,311 B2 * | 3/2011 | Di Giacomo | ........... | F16H 7/023 |
| | | | | 474/148 |
| 2006/0219529 A1 | 10/2006 | Schiltz | | |
| 2007/0175737 A1 * | 8/2007 | Honeycutt | ............. | B65G 15/62 |
| | | | | 198/822 |
| 2007/0179002 A1 * | 8/2007 | DeGroot | ................ | B65G 15/42 |
| | | | | 474/205 |
| 2012/0094795 A1 * | 4/2012 | Wang | ................... | F16H 55/171 |
| | | | | 474/153 |

\* cited by examiner

REDUCED NOISE TOOTHED BELT DRIVE

CROSS REFERENCE TO PRIOR APPLICATIONS

Priority is claimed to German Patent Application No. DE 10 2019 122 958.8, filed Aug. 27, 2019. The entire disclosure of said application is incorporated by reference herein.

FIELD

The present invention relates to a toothed belt drive and to an arrangement of toothed belt drives for transport within the context of a production and/or packaging process, as used, for example, in the production of food products, in particular in the production of a cheese mass which is filled into a film tube.

BACKGROUND

DE 33 05 504 C2 describes a toothed belt drive which, compared with drives known at the time, considerably reduced operating noise, in particular at high rotational speeds and with wide toothed belts. Operating noise occurs above all when the toothed surfaces of the conveyor belts and the toothed drive rollers engage into one another and the air which is situated between the "teeth" must escape. DE 33 05 504 C2 provides escape paths for the air on the gearwheels, which escape paths are configured as grooves which run transversely with respect to the rotational direction of the gearwheels and radially around the gearwheels. DE 33 05 504 C2 provides that a groove of this type can also be provided along the inner circumference of the toothed belt/conveyor belt.

Toothed belt drives of this type frequently have a considerable length. The longer a conveyor belt of this type which is to be provided between the drive roller and a deflection roller, the greater the risk of the conveyor belt "sagging". In order to prevent this type of "sagging", support rollers which support the conveyor belt are provided between the drive roller and the deflection roller.

SUMMARY

An object of the present invention is to provide a toothed belt drive and an arrangement of toothed belt drives which reduces the operating noise during operation while retaining a high stability.

In an embodiment, the present invention provides a toothed belt drive for transport in at least one of a production process and a packaging process. The toothed belt drive includes at least one drive roller comprising a toothing system which runs along an outer circumference of the at least one drive roller, at least one conveyor belt which is configured to be driven by the at least one drive roller in a circulating direction, and at least one support roller. The at least one conveyor belt comprises a toothing system along an inner side of the at least one conveyor belt and at least one continuous groove in the toothing system parallel to the circulating direction. The at least one support roller comprises at least one support disk which is configured to project radially as an elevation so as to bear in a force-loading manner against the inner side of the at least one conveyor belt. The elevation is configured to be a counterpart to the at least one continuous groove of the at least one conveyor belt. The at least one support disk is arranged so that the elevation lies on a bottom of the at least one continuous groove.

BRIEF DESCRIPTION OF THE DRAWINGS

The present invention is described in greater detail below on the basis of embodiments and of the drawings in which.

DETAILED DESCRIPTION

In an embodiment of the present invention, a toothed belt drive for transport in a production and/or packaging process is provided, the toothed belt drive comprising a drive roller with a toothing system which runs along its outer circumference, and a conveyor belt which has a toothing system along its inner side which is driven by the drive roller, the conveyor belt having, parallel to its circulating direction, one or more continuous grooves in the toothing system.

A core concept of the present invention is that one or more support rollers are provided which have one or more support disks with a greater radius, the support disks bearing in a supporting manner against the inner side of the conveyor belt and therefore being configured, to all intents and purposes, as counterparts to the grooves of the conveyor belt. The support disks are thereby arranged so that they lie as radial elevations of the support rollers on the bottom of the grooves. The support disks are in particular configured as elevations of the respective support roller. The support roller is therefore configured in this sense in one piece together with the support disks, and the two rotate jointly as one functional unit.

The embodiment according to the present invention considerably reduces the development of noise since, in the case of the support rollers, neither is air displaced, nor does the toothing system of the conveyor belt come into contact with the circumference of the support rollers. The conveyor belt is therefore to all intents and purposes "supported" in a smoothly running manner merely by the support disks.

Measurements have here shown that the noise level can be reduced by 10-15 dB. A further advantage of the present invention is that the lateral guidance of the conveyor belt is assumed by the grooves and, as a result, flanged disks can be dispensed with so that the lateral wear of the conveyor belt is reduced. The risk is thereby also minimized that foreign bodies which contaminate the product can pass onto the conveyor belt. A further positive consequence is a reduction of costs since the production of support rollers without a toothing system is considerably less expensive.

The conveyor belt can, for example, run around the drive roller and a deflection roller which is not driven, the support rollers being arranged between the two rollers. This makes it possible for a conveyor belt with a toothed belt drive and with a flexible length to be provided, whereby the conveyor belt runs around the drive roller in an endless manner.

In an embodiment of the present invention, the deflection roller can, for example, be configured as a drive roller. It is sometimes necessary to drive the conveyor belt via two rollers in order to uniformly distribute the load. If, however, the focus lies on reducing the noise level, the deflection roller can be configured like the support roller with support disks.

The height of the elevations which are formed by the support disks is advantageously at least as high as the depth of the grooves. This has the technical effect that the toothing system of the conveyor belt does not come into contact with the circumference of the support roller. The higher the elevations in comparison to the depth of the grooves, the lower the risk that the toothing system of the conveyor belt comes into contact with the support roller.

The circumference of the elevation can, for example, have a flat configuration. A rolling of the support disks which is as efficient and material-protecting as possible is thereby provided on the bottom/base of the grooves.

The support rollers can, for example, load the conveyor belt via a spring. Via a corresponding selection of the spring, the pressure on the conveyor belt can be varied in a targeted manner, changed, and adapted to the product to be transported. Springs are in particular provided in the case of a vertical conveyor belt guide direction. Springs can be dispensed with if the conveyor belt guide direction runs horizontally, i.e., in a "flat" manner.

The present invention also provides an arrangement which can, for example, comprise two toothed belt drives according to the present invention with the above-described features, the first toothed belt drive being arranged spaced apart from (in particular, above or next to) the second toothed belt drive. The conveyor belts of the first and of the second toothed belt drive thereby provide a transport channel through which the product is transported. It is thus possible, for example, to transport the product through the transport channel and to exert a defined force on the product via the support rollers. Not only transport, but rather also a processing option is therefore provided. These processing options comprise, for example, molding or shaping on one side or on both sides.

An alternative arrangement can also be provided in which the toothed belt drive according to the present invention is arranged spaced apart from a conventional toothed belt drive. Although the noise reduction achieved in this case is less than would be the case using two toothed belt drives according to the present invention, this arrangement nonetheless achieves a reduction in noise emission.

In an embodiment of the present invention, the support rollers of the first toothed belt drive and of the second toothed belt drive can, for example, be arranged offset with respect to one another in the circulating direction. In particular in the case of the transport of a pasty food mass, such as cheese, this results in the food mass as it were meandering through a wave-like course. This offset arrangement imparts more friction to the conveyor belt. As an alternative, the support rollers can also be provided so as to lie opposite, in particular when less friction is sufficient for the conveyor belt.

The present invention also provides the use of the support disks for guiding the conveyor belt. The support disks are thereby oriented parallel to the circulating direction of the conveyor belt, and engage with their elevations into the grooves of the conveyor belt. The freedom of movement of the conveyor belt is thereby restricted perpendicularly with respect to the circulating direction, and, to all intents and purposes, the conveyor belt is guided via the support disks in parallel with respect to their orientation. This advantageously makes it possible for so called flanged disks, which are conventionally used for guiding the conveyor belt, to be dispensed with, as a result of which the load of the side faces of the conveyor belt is largely decreased. This also results in a reduction of the risk of foreign bodies which are otherwise produced by virtue of the fact that the flanged disk can release material from the conveyor belt. A longer service life of the toothed belt drive is thereby advantageously achieved.

The present invention also provides a toothed belt drive for transport in a production and/or packaging process, the toothed belt drive comprising:

at least one drive roller with a toothing system which runs along its outer circumference;

at least one conveyor belt which has a toothing system along its inner side which is driven by the drive roller, the conveyor belt having, parallel to its circulating direction, one or more continuous grooves in the toothing system; and at least one deflection roller, the conveyor belt running around the deflection roller, wherein the at least one deflection roller has one or more radially projecting support disks as elevations along its axis which bear in a force-loading manner against the inner side of the conveyor belt, the elevations being configured as counterparts to the grooves of the conveyor belt, and the support disks being arranged so that the elevations lie on the bottom of the grooves.

The development of noise is advantageously thereby considerably reduced since, in the case of the operation of the deflection roller, air is neither displaced nor does the toothing system of the conveyor belt come into contact with the circumference of the deflection roller. The conveyor belt is therefore to all intents and purposes "supported" in a smoothly running manner merely by the support disks of the deflection roller. Support rollers are expediently used in the case of a toothed belt drive only when the toothed belt drive goes beyond a certain length and/or when a heavy load must be conveyed. The toothed belt drive of the present invention can therefore be used both with support rollers and without support rollers.

The present invention also provides a toothed belt drive for transport in a production and/or packaging process, the toothed belt drive comprising:

at least one drive roller with a toothing system which runs along its outer circumference;

at least one conveyor belt which has a toothing system along its inner side and which is driven by the drive roller, the conveyor belt having, parallel to its circulating direction, one or more continuous grooves in the toothing system; and at least one deflection roller, the conveyor belt running around the deflection roller, wherein the at least one drive roller has one or more radially projecting support disks along its axis as elevations which bear in a force-loading manner against the inner side of the conveyor belt, the elevations being configured as counterparts to the grooves of the conveyor belt, and the support disks are arranged so that the elevations lie on the bottom of the grooves.

Noise development is thereby considerably advantageously reduced since, in the case of the operation of the drive roller, air is neither displaced nor does the toothing system of the conveyor belt come into contact with the circumference of the drive roller. The conveyor belt is therefore for all intents and purposes "supported" in a smoothly running manner merely by the support disks of the drive roller. In order to simplify the production of a drive roller with support disks, it is possible for a drive roller of this type to be cast, for example, from a plastic material, or to be produced in a 3D printer.

The support disks can, for example, project beyond the toothing systems of the drive roller. This affords the advantage that the support disks of the drive roller can lie on the bottom of the grooves, while the toothing systems can at the same time be held effectively in the toothing system of the conveyor belt. The radius of the support disks must here be selected to not be too large in order to avoid the two toothing systems no longer being able to engage into one another.

The support rollers with support disks, the deflection roller with support disks, and/or the drive roller with support disks can be combined with one another in any desired way, in order to increase the effect of the noise reduction of the gearwheel drive.

Numerous features of the present invention will be described in greater detail below based on various embodiments. The present disclosure is thereby not restricted to the specifically mentioned combinations of features. The features mentioned can much rather be combined as desired to form embodiments according to the present invention, unless such a combination this is expressly ruled out herein.

Figure 1:
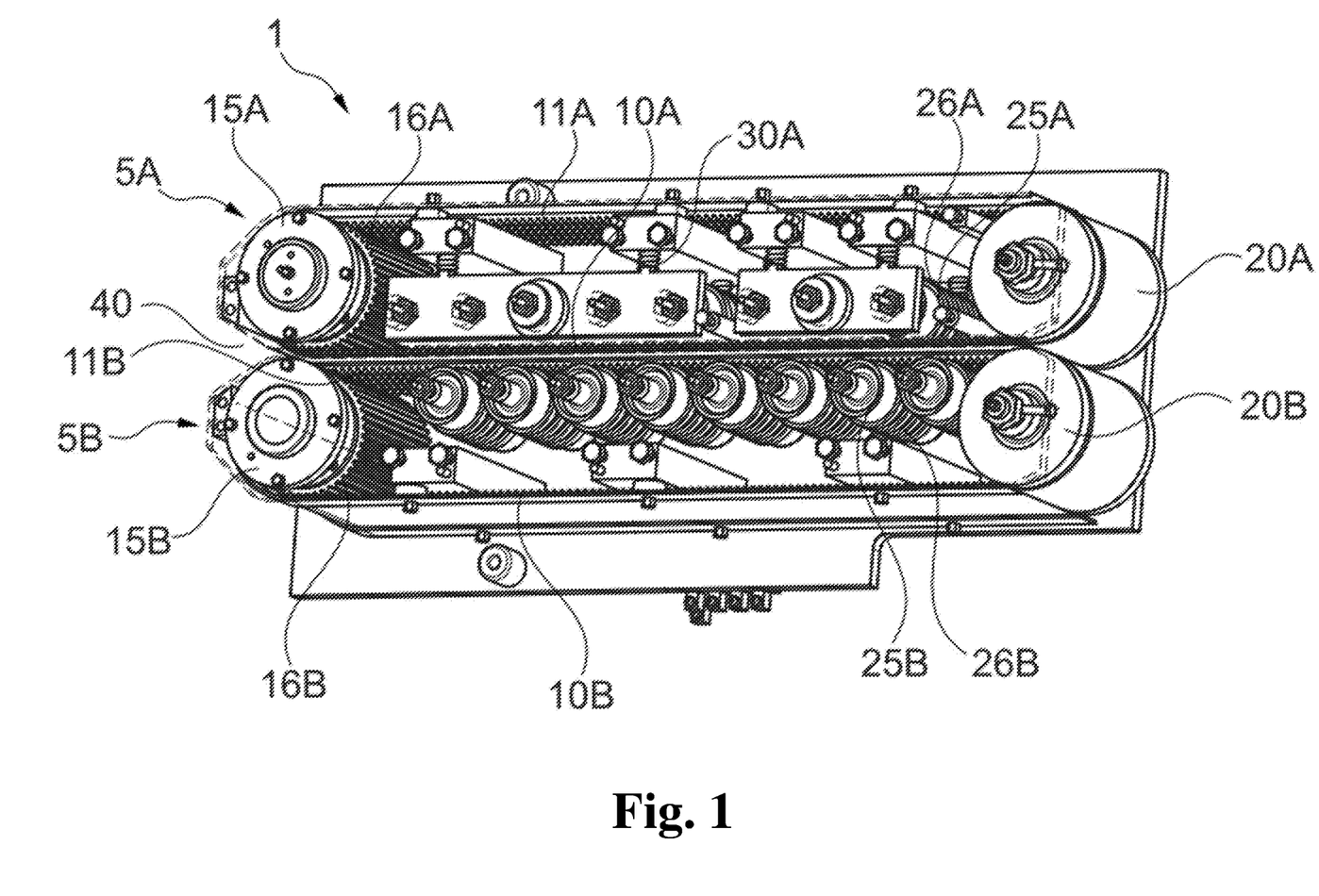
FIG. 1 shows an arrangement according to the present invention for transport in a production and/or a packaging process which comprises two toothed belt drives.

FIG. 1 shows the arrangement 1 according to the present invention for transport in a production and/or packaging process, comprising two toothed belt drives 5A, 5B. Each of the two toothed belt drives 5A, 5B are run around by a conveyor belt 10A, 10B. Each of the conveyor belts 10A, 10B run around a drive roller 15A, 15B and a deflection roller 20A, 20B in an endless manner. The drive rollers 15A, 15B are driven by a motor (which is not shown in the drawings) and in each case have a toothing system 16A, 16B which is in an operative connection with a corresponding toothing system 11A, 11B of the conveyor belts 10A, 10B. The conveyor belts 10A, 10B move in the transport direction when the drive rollers 15A, 15B rotate.

A plurality of (for example, eight) support rollers 25A, 25B made from stainless steel or plastic or aluminum are in each case provided between the respective drive rollers 15A, 15B and the deflection rollers 20A, 20B, the support rollers 25A, 25B supporting or loading the conveyor belts 10A, 10B with force. The loading with force is realized by virtue of the fact that spring elements 30A are provided on one of the toothed belt drives (in the present case, the toothed belt drive 5A), which spring elements 30A exert a force on the support rollers 25A, 25B perpendicular with respect to the circulating direction of the conveyor belts 10A, 10B. The number and positioning of the spring elements 30A can be of variable configuration and, as a result, can be adapted in an optimum manner to the desired conditions. In order to prevent a sagging of the conveyor belts, the support rollers 25A, 25B of each toothed belt drive 5A, 5B are arranged in the transport direction so that they are directly adjacent in the circulating direction. The toothed belt drive 5A is arranged spaced apart from the toothed belt drive 5B in some way, with the result that the conveyor belts 10A, 10B here configure a transport shaft 40 and face one another directly with their surfaces. A pasty, moldable food mass, such as cheese, can be guided through and at the same time shaped via the transport shaft 40. The radially projecting support disks 26A, 26B of the support rollers 25A, 25B can also be seen in FIG. 1. The support disks 26A, 26B are provided as radial elevations of the support rollers 25A, 25B and form a unit of single piece configuration together with the support rollers 25A, 25B. The following drawings show in detail how the support disks 26A, 26B lead to a reduction in noise of the toothed belt drive or the arrangement 1.

Figure 2:
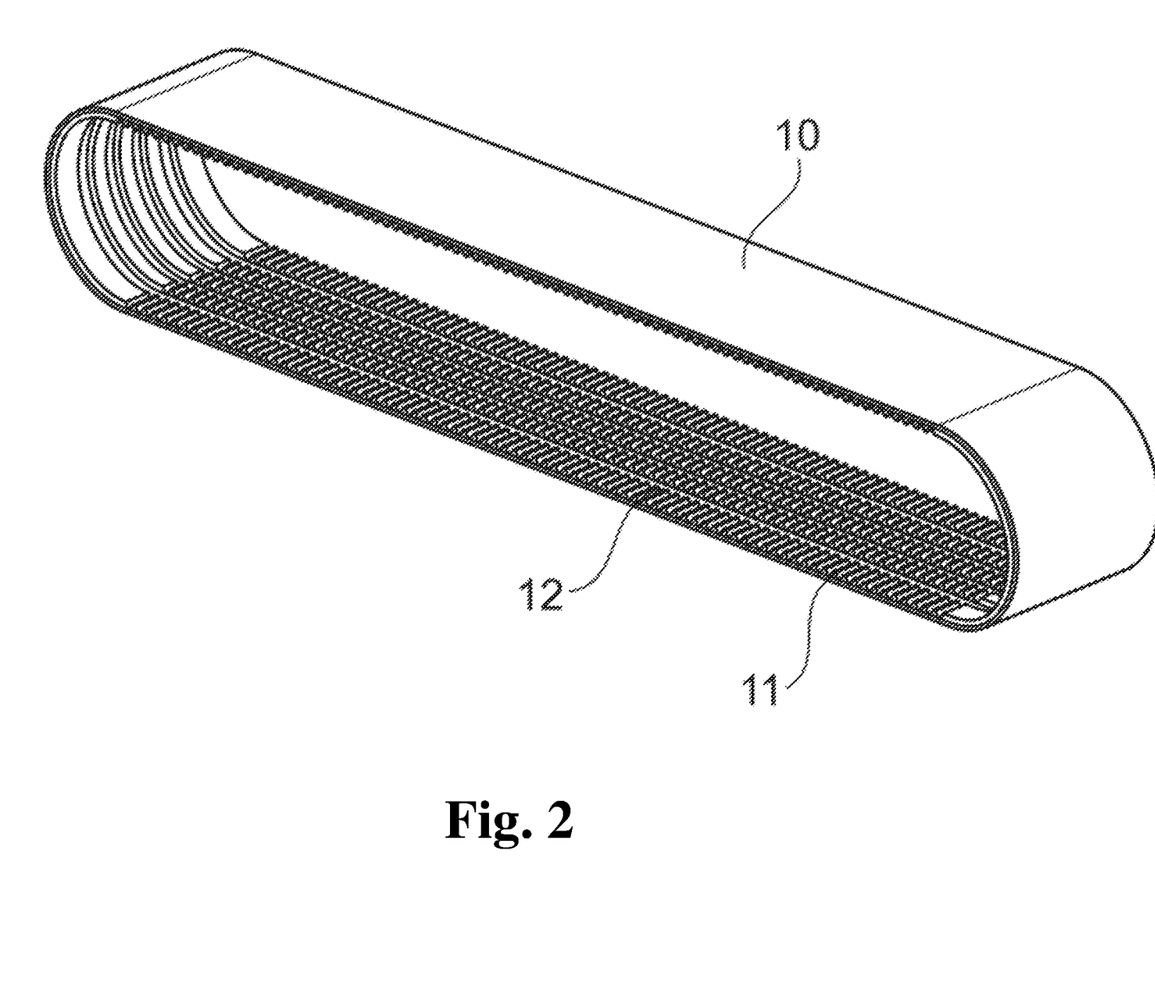
FIG. 2 shows a conveyor belt according to the present invention.

FIG. 2 shows a freestanding conveyor belt 10 in a perspective view, with the result that its construction can more easily be seen. The toothing system 11 is penetrated by a groove 12 which runs continuously in a straight line. The groove 12 here runs along the transport direction/circulating direction. In FIG. 2, to this end, four grooves 12 are made in the toothing system 11, it being possible for the number to be in principle freely selected. The greater the number of grooves 12, the more uniform a force can be transmitted to the conveyor belt 10 via the support disks 26, as will be shown below. The grooves 12 have a defined depth and have a planar base or bottom. A wall of the grooves 12 can, for example, taper in a straight or in a v-shaped manner via this bottom. The shape which tapers in a v-shaped manner can facilitate centering in the case of the introduction of the support disk, it also being possible for the rectilinear wall to be produced less expensively.

Figure 3:
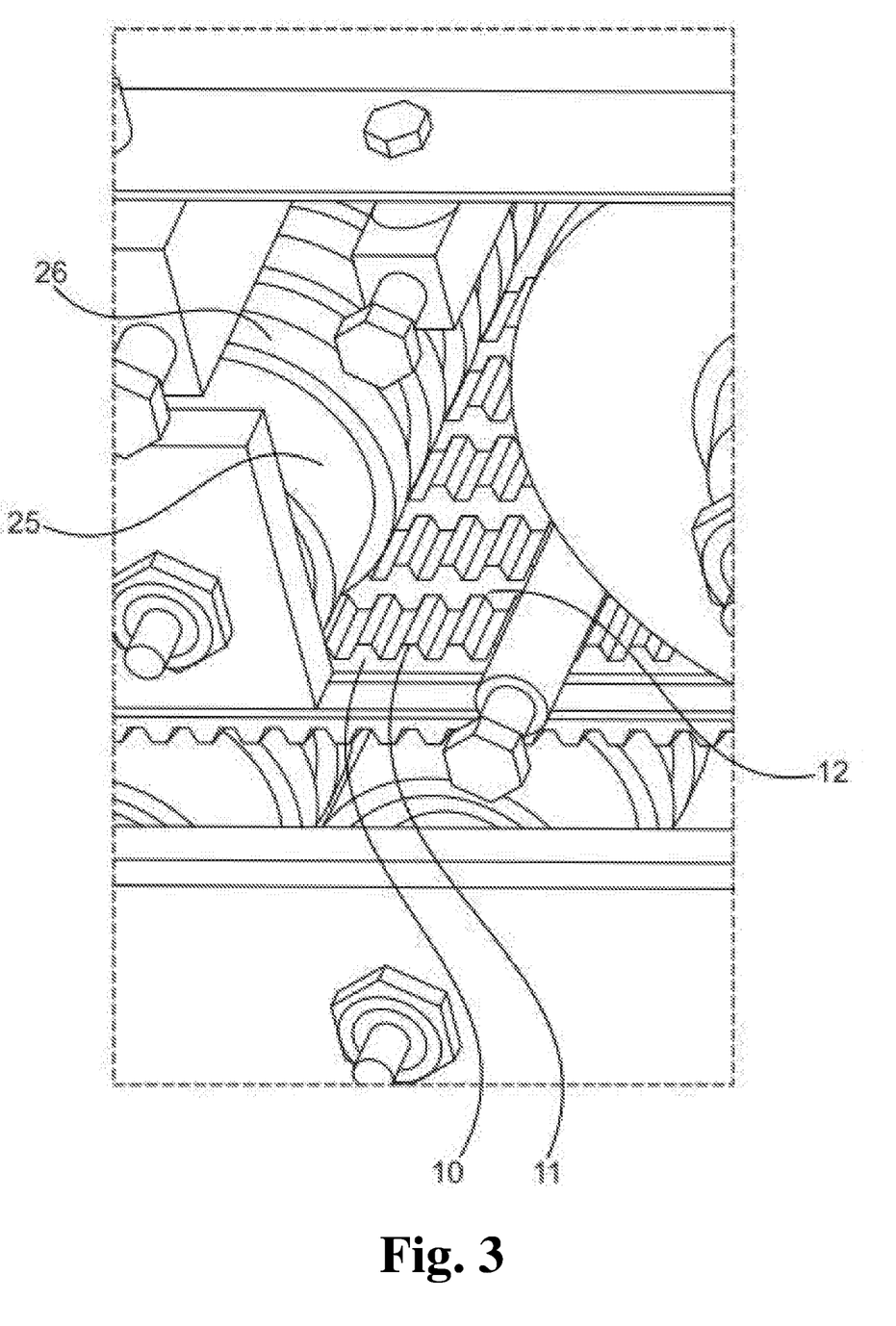
FIG. 3 shows a detailed view of an interaction between the support rollers and the conveyor belt.

FIG. 3 shows in a detailed view how the support disk 26 of the support rollers 25 lies on the bottom of the groove 12 and rolls thereon. The fact that the height of the elevation of the support disk 26 is at least exactly as high as the depression of the groove 12 avoids a situation where the toothing system 11 comes into contact with the circumference of the support rollers 25. Measurements have shown that this can reduce the noise level by 10-15 dB. In order to also provide this for a plurality of support rollers 25, the support rollers 25 must be arranged behind one another in an aligned manner, with the result that their respective support disk 26 can be received into the groove 12 which runs in a straight line.

The toothed belt drives 5A, 5B from FIG. 1 can also have an alternative configuration in order to reduce noise and to increase the lateral stability of the guidance of the conveyor belt.

Whether the support rollers 25A, 25B must be used at all depends substantially on the length and the load of the conveyor belt, with the result that embodiments can also be provided without support rollers 25A, 25B.

Both in the case of embodiments of the toothed belt drives 5A, 5B with or without support rollers 25A, 25B, there is a further option for noise reduction and the provision of lateral guidance of the conveyor belt by virtue of the fact that the deflection roller 20A, 20B and/or the drive roller 15A, 15B likewise have/has radially projecting support disks 17, 21 which roll on the bottom of the grooves 12 of the conveyor belt 10A, 10B. As has already been described in conjunction with the support rollers 25A, 25B, this leads to an effective reduction of the contact area, which results in a minimization of the operating noise.

Figure 4:
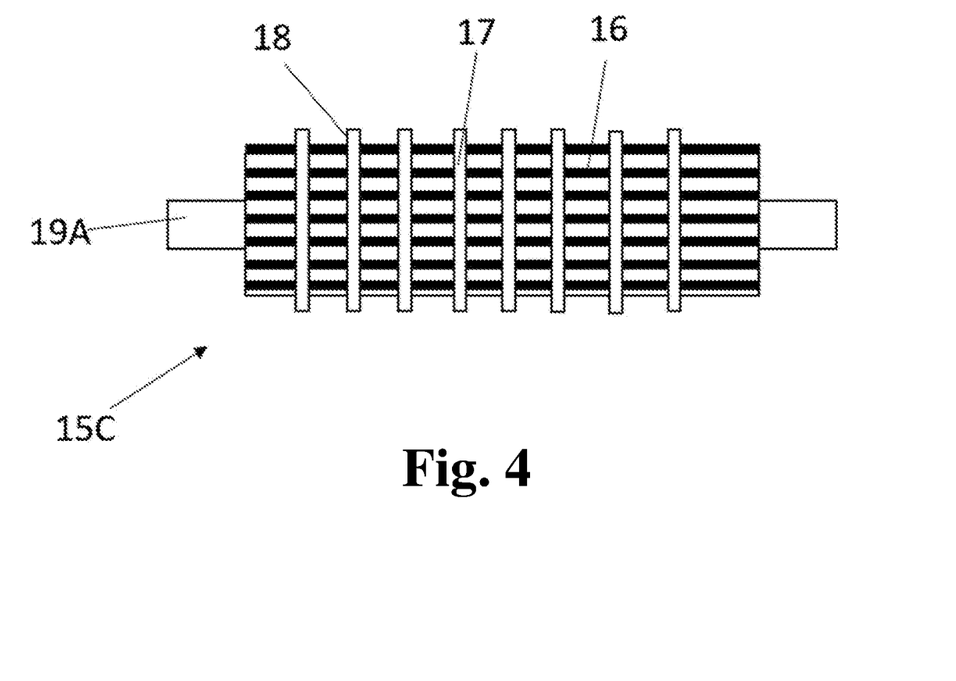
FIG. 4 shows a drive roller with support disks.

The drive roller 15A, 15B from FIG. 1 can therefore be replaced by a drive roller 15C according to FIG. 4 which, in addition to its toothing system 16, has at least one or more radially projecting support disks 17 along its axis 19A. In comparison with the external circumference of the toothing system at 16, the radius of the support disks 17 is configured so that the support disks 17 project with a section "s" 18 beyond the external circumference of the toothing system. The section "s" 18 is here configured so that the support disks can roll on the bottom of the grooves 12 of the conveyor belt 10.

Figure 5:
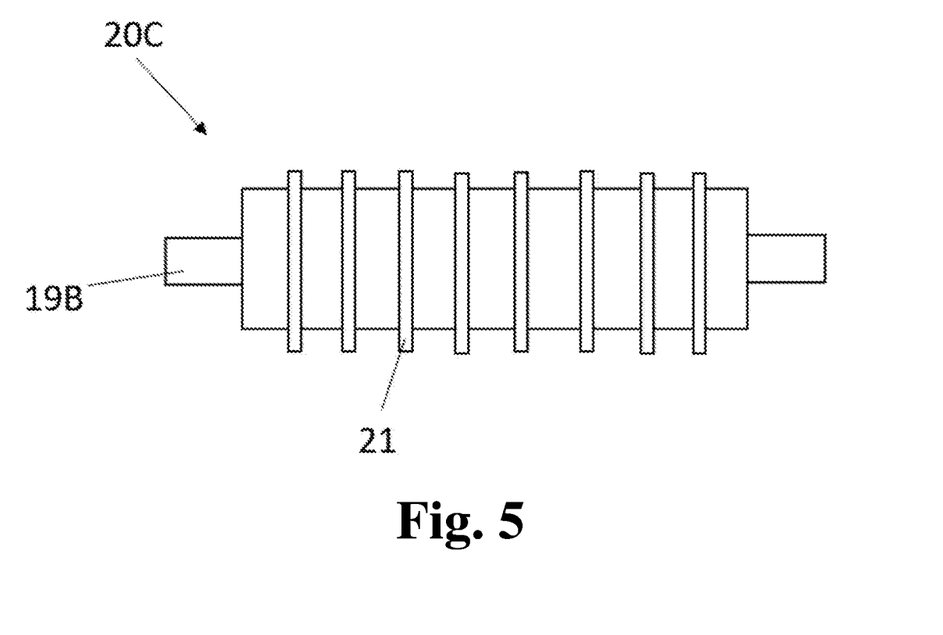
FIG. 5 shows a deflection roller with support disks.

The deflection roller 20A, 20B from FIG. 1 can therefore be replaced by a deflection roller 20C according to FIG. 5 which has one or more radially projecting support disks 21 along its axis 19B. The radius of the support disks 21 is configured so that the support disks can roll on the bottom of the grooves 12 of the conveyor belt 10, and so that the toothing system 16 of the drive roller 15C effectively engages into the toothing system 11 of the conveyor belt 10.

The following combinations of the toothed belt drive for noise reduction and for the provision of lateral guidance of the conveyor belt during operation are consequently possible:

1) drive roller with support disk, deflection roller without support disks;
2) drive roller without support disks, deflection roller with support disks;
3) drive roller with support disks, deflection roller with support disks;
4) drive roller with support disks, deflection roller without support disks; support roller without support disks;
5) drive roller with support disks, deflection roller without support disks; support roller with support disks;
6) drive roller without support disks, deflection roller without support disks; support roller with support disks;
7) drive roller without support disks, deflection roller with support disks; support roller without support disks;
8) drive roller with support disks, deflection roller with support disks; support roller without support disks; and
9) drive roller with support disks, deflection roller with support disks; support roller with support disks.

The present invention is not limited to embodiments described herein; reference should be had to the appended claims.

What is claimed is:

1. A toothed belt drive for transport in at least one of a production process and a packaging process, the toothed belt drive comprising:
   at least one drive roller comprising a toothing system which runs along an outer circumference of the at least one drive roller;
   at least one conveyor belt which is configured to be driven by the at least one drive roller in a circulating direction, the at least one conveyor belt comprising a toothing system along an inner side of the at least one conveyor belt and a plurality of continuous grooves in the toothing system parallel to the circulating direction; and
   at least one support roller which comprises a plurality of support disks, each of which is configured to project radially as an elevation so as to bear in a force-loading manner against the inner side of the at least one conveyor belt, the elevation being configured to be a counterpart to the plurality of continuous grooves of the at least one conveyor belt,
   wherein,
   each of the plurality of support disks is arranged so that the elevation lies on a bottom of one of the plurality of continuous grooves.

2. The toothed belt drive as recited in claim 1, further comprising:
   a deflection roller,
   wherein,
   the at least one conveyor belt is further configured to run around the least one drive roller and the deflection roller, and
   the at least one support roller is arranged between the at least one drive roller and the deflection roller.

3. The toothed belt drive as recited in claim 2, wherein the deflection roller is configured either like the at least one drive roller or like the at least one support roller.

4. The toothed belt drive as recited in claim 1, wherein, the elevation is configured to have a height,
   each of the plurality of continuous grooves comprises a depth, and
   the height of the elevation is configured to be at least as high as the depth of the plurality of continuous grooves.

5. The toothed belt drive as recited in claim 1, wherein the elevation of the at least one support roller comprises an upper side having a flat configuration which is perpendicular with respect to the circulating direction.

6. The toothed belt drive as recited in claim 1, further comprising:
   a spring which is configured to load the at least one support roller against the conveyor belt.

7. A method of using the plurality of support disks to guide the conveyor belt suitable for the toothed belt drive as recited claim 1, the method comprising:
   providing the toothed belt drive as recited in claim 1,
   orienting the plurality of support disks of the toothed belt drive to be parallel to the circulating direction of the at least one conveyor belt of the toothed belt drive, and
   using the plurality of support disks so that one of the plurality of support disks engages into one of the plurality of continuous grooves of the conveyor belt so as to guide the conveyor belt.

8. An arrangement comprising:
   a first toothed belt drive for transport in at least one of a production process and a packaging process, the first toothed belt drive comprising,
      at least one drive roller comprising a toothing system which runs along an outer circumference of the at least one drive roller,
      at least one conveyor belt which is configured to be driven by the at least one drive roller in a circulating direction, the at least one conveyor belt comprising a toothing system along an inner side of the at least one conveyor belt and a plurality of continuous grooves in the toothing system parallel to the circulating direction, and
      at least one support roller which comprises a plurality of support disks, each of which is configured to project radially as an elevation so as to bear in a force-loading manner against the inner side of the at least one conveyor belt, the elevation being configured to be a counterpart to the plurality of continuous grooves of the at least one conveyor belt,
      wherein,
      each of the plurality of support disks is arranged so that the elevation lies on a bottom of one of the plurality of continuous grooves; and
   a second toothed belt drive for transport in at least one of the production process and the packaging process, the second toothed belt drive comprising,
      at least one drive roller comprising a toothing system which runs along an outer circumference of the at least one drive roller,
      at least one conveyor belt which is configured to be driven by the at least one drive roller in a circulating direction, the at least one conveyor belt comprising a toothing system along an inner side of the at least one conveyor belt and a plurality of continuous grooves in the toothing system parallel to the circulating direction, and
      at least one support roller which comprises a plurality of support disks, each of which is configured to project radially as an elevation so as to bear in a force-loading manner against the inner side of the at least one conveyor belt, the elevation being configured to be a counterpart to the plurality of continuous grooves of the at least one conveyor belt,
      wherein,
      each of the plurality of support disks is arranged so that the elevation lies on a bottom of one of the plurality of continuous grooves,
   wherein,
   the first toothed belt drive is arranged spaced apart next to the second toothed belt drive, the at least one support roller of the first toothed belt drive is arranged to face the at least one support roller of the second toothed belt drive, and the at least one conveyor belt of the first toothed belt drive and the at least one conveyor belt of the second toothed belt drive are configured to provide a transport shaft.

9. The arrangement as recited in claim 8, wherein the at least one support roller of the first toothed belt drive and the at least one support roller of the second toothed belt drive are arranged offset with respect to one another in the circulating direction.

10. The arrangement as recited in claim 8, wherein the at least one support roller of the first toothed belt drive and the at least one support roller of the second toothed belt drive are arranged to lie opposite one another in the circulating direction.

11. A toothed belt drive for transport in at least one of a production process and a packaging process, the toothed belt drive comprising:

at least one drive roller comprising a toothing system which runs along an outer circumference of the at least one drive roller;

at least one conveyor belt which is configured to be driven by the at least one drive roller in a circulating direction, the at least one conveyor belt comprising a toothing system along an inner side of the at least one conveyor belt and a plurality of continuous grooves in the toothing system parallel to the circulating direction; and at least one deflection roller which comprises a plurality of radially projecting support disks as an elevation so as to bear in a force-loading manner against the inner side of the at least one conveyor belt, the elevation being configured to be a counterpart to the continuous grooves of the at least one conveyor belt, wherein, the at least one conveyor belt is configured to run around the at least one deflection roller, and each of the plurality of radially projection support disks is arranged so that the elevation lies on a bottom of one of the plurality of continuous grooves.

12. A toothed belt drive transport in at least one of a production process and a packaging process, the toothed belt drive comprising:

at least one drive roller comprising a toothing system which runs along an outer circumference of the at least one drive roller;

at least one conveyor belt which is configured to be driven by the at least one drive roller in a circulating direction, the at least one conveyor belt comprising a toothing system along an inner side of the at least one conveyor belt and at least one continuous groove in the toothing system parallel to the circulating direction;

at least one deflection roller, the at least one conveyor belt being configured to run around the at least one deflection roller; and wherein, the at least one drive roller comprises at least one radially projecting support disk as an elevation so as to bear in a force-loading manner against the inner side of the at least one conveyor belt, the elevation is configured as a counterpart to the at least one continuous groove of the at least one conveyor belt, the at least one radially projecting support disk is arranged so that the elevation lies on a bottom of the at least one continuous groove, and the at least one radially-projecting support disk is further configured to project beyond the toothing system.

* * * * *